March 14, 1961 R. C. REEL ET AL 2,974,931
LOAD HOLDER
Filed May 28, 1957
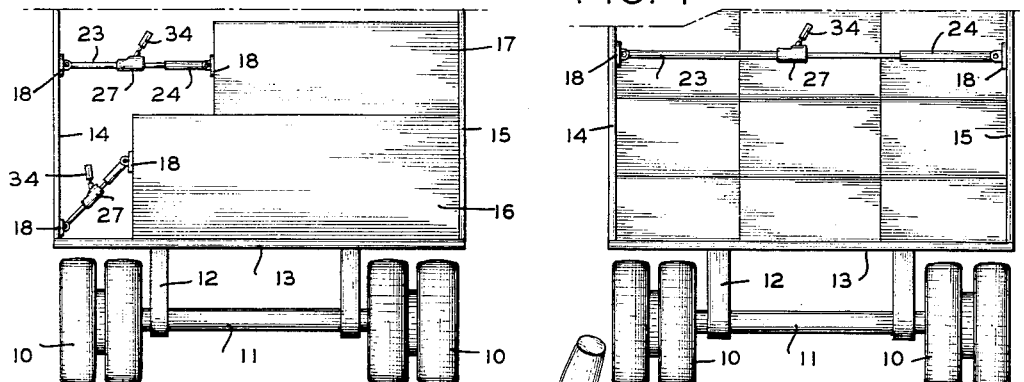
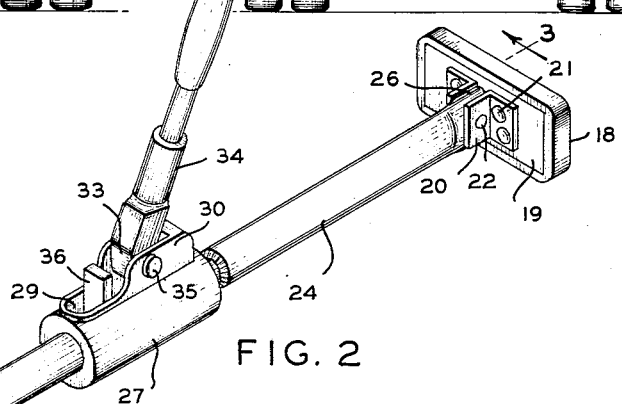
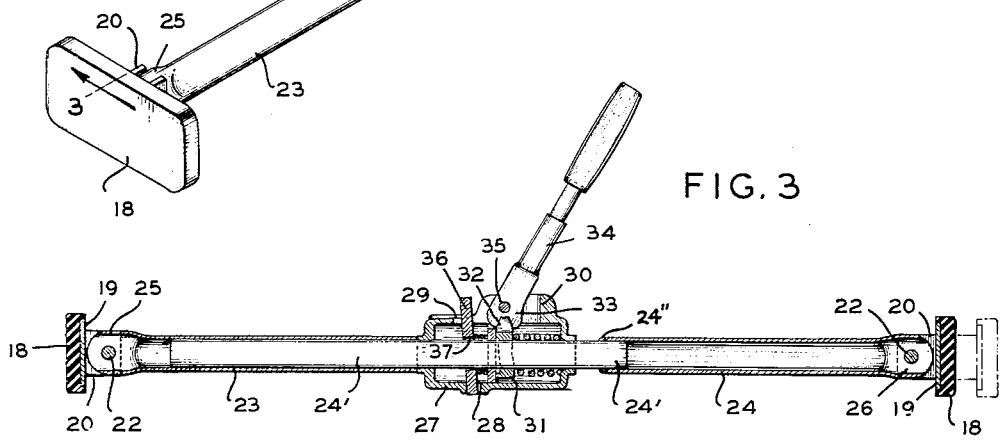
INVENTORS
R. C. REEL
L. L. TOWELL
BY *HYatesDowell I&II*
ATTORNEYS

United States Patent Office 2,974,931
Patented Mar. 14, 1961

2,974,931

LOAD HOLDER

Roy C. Reel, 814 Escambia Drive, and Lester Louis Towell, 1801 French Ave., both of Sanford, Fla.

Filed May 28, 1957, Ser. No. 662,131

1 Claim. (Cl. 254—106)

This invention relates to the care handling and transportation of commodities of various kinds and to vehicles and equipment employed in such services, as well as to the arrangement of the articles constituting the cargo of such vehicles.

The invention relates particularly to the maintenance of commodities in a definite and fixed location on transporting vehicles of various kinds and especially to an adjustable device for this purpose such as for example an adjustable brace or shoring jack which can be applied and set for maintaining surfaces in a definite spaced relation.

In the hauling of cargo including relatively heavy articles frequently shifting of such articles has caused accidents resulting among other things in substanital damage to the cargo, to the vehicle or carrier, and to human beings. It also has caused other undesirable results such as delay in transit and increase in maintenance and insurance. Efforts have been made to solve this problem by the use of vehicles and equipment of various kinds and by anchoring the cargo against shifting but all without satisfactory results.

It is an object of the invention to overcome the difficulties enumerated and to provide a relatively simple, inexpensive, adjustable, easily applicable and removable brace or shoring jack which can be easily produced from readily available materials and operated without skilled labor as well as a device of this kind which can be applied to prevent cargo against shifting and which can be maintained without skilled labor.

Another object of the invention is to provide a device of the character indicated which is of relatively light weight, composed of parts which are readily available but when assembled provide a new and improved structure capable of producing the desired results.

Other objects and advantages of the invention will be apparent from the following description taken in conjunction with the accompanying drawing wherein:

Fig. 1, is a rear elevation of a cargo carrier illustrating the use of one application of the invention;

Fig. 2, a perspective of the invention;

Fig. 3, a longitudinal vertical section on the line 3—3 of Fig. 2; and

Fig. 4, a rear elevation of a cargo carrier illustrating a further use of the invention.

Briefly stated, the adjustable brace or shoring jack of the present invention comprises a pair of adjustable object engaging pads or feet pivotally connected to opposite ends of a pair of aligned telescopic members and with mechanical means including a lever which can be operated for forceably moving such members relatively in a manner to extend or reduce their length to thereby engage and maintain objects in spaced relation.

With continued reference to the drawing in order to transport commodities a carrier may be employed in the form of a truck having wheels 10, on an axle 11 in which is mounted an undercarriage or frame 12 supporting a floor or bed 13 and having side walls 14 and 15.

A cargo is adapted to be carried between the sides 14 and 15 on said truck and such cargo may include shipping containers or other articles 16 and 17 the dimensions of which are less than the width of the carrier and need some form of bracing or anchoring to prevent shifting.

Anchoring means may be provided as illustrated comprising a pair of feet or friction pads including resilient cushions 18, mounted or otherwise attached to a plate 19, provided with a pair of opposed L-shaped brackets 20 attached by rivets 21 to the plate 19 and themselves supporting and connected by a pivot 22.

The pads 18 are adapted to be disposed one against an object desired to be held in fixed position and the other against another object such as a floor, side of a vertical wall or the like and then pressure is exerted upon the pads in their spaced relation so that they will remain fixed.

In order to apply pressure to move the feet or pads 18 apart a pair of telescopic members 23 and 24 having flattened end portions 25 and 26 have their remote ends mounted on the pivots 22. The portion of each of the members 23 and 24 adjacent the pads is preferably of a pipe section with the member 24 having a rod 24' axially welded at 24'' or otherwise secured therein or as an integral part thereof and snugly received within the member 23 to permit the pads 18 to be moved toward and from each other.

In order to accomplish such extension and retraction of the members an enlarged sleeve 27 is provided, such sleeve forming an extension of the member 23 against which it abuts at one end, its other end receiving the rod or piston 24' so that the latter is axially slideable.

The housing-forming sleeve 27 has an opening 28 at one side and an opening 29 at the opposite side the latter being provided with an outwardly extending wall 30 disposed along both sides and across one end of such opening in order to move the rod 24'. To the right in Figs. 2 and 3 a clutch collar 31 is provided having a manipulating portion 32 engaged within the bifurcated end 33 of an operating handle 34, such handle being mounted near its bifurcated end on pivot 35 so that when the handle is oscillated on such pivot the rod 24' will be moved to the right and outwardly of the sleeve 23.

In order to lock the rod 24' and sleeve 23 in fixed relation a locking member 36 is provided, such member having a central opening 37 in which said rod 24' is slideably received. The member 36 has one end located in the opening 28 and its longer end located in the opening 29 where it is accessible for releasing the tension between the members to permit their over-all length to be reduced. The exposed end of the member 36 when moved to the right in Figs. 2 and 3 will permit sliding of the rod 24' within such member.

It will be apparent from the foregoing that a structure is provided by which surfaces may be maintained definitely spaced under pressure and the application and removal of the mechanism is relatively easy.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A load holder comprising two sleeves each flattened at one end, a pair of resilient friction pads, one for each flattened end of the sleeves, each pad having a pair of ears embracing its associated flattened end of the sleeve with a pivot passing through the ears and the flattened end to allow the pad to assume a wide range of angular positions, a smooth surfaced shaft secured within one of said sleeves and extending beyond the unflattened end of the sleeve, a force multiplying means gripping said shaft and movable therealong, said shaft having a free end extending through the force multiplying means, the second sleeve telescoping said extending free end and in abutting relationship with the force multiplying means, whereby the holder may be placed in a wide range of angular positions relative to two opposing surfaces and can apply opposing forces to said surfaces.

References Cited in the file of this patent

UNITED STATES PATENTS

| 704,403 | Thill | July 8, 1902 |
| 1,349,576 | Markham | Aug. 17, 1920 |
| 1,372,005 | Brandt | Mar. 22, 1921 |
| 2,670,174 | Lucker | Feb. 23, 1954 |
| 2,718,253 | Zinke | Sept. 20, 1955 |